United States Patent [19]
Bickerton

[11] Patent Number: 5,278,911
[45] Date of Patent: Jan. 11, 1994

[54] SPEECH RECOGNITION USING A NEURAL NET

[75] Inventor: Ian Bickerton, Leckhampton, England

[73] Assignee: Smiths Industries Public Limited Company, London, England

[21] Appl. No.: 908,920

[22] Filed: Jul. 2, 1992

Related U.S. Application Data

[63] Continuation-in-part of Ser. No. 517,182, May 1, 1990, abandoned.

[30] Foreign Application Priority Data

May 18, 1989 [GB] United Kingdom ................ 8911461

[51] Int. Cl.⁵ .............................................. G10L 7/08
[52] U.S. Cl. ..................................... 381/43; 395/2.41
[58] Field of Search ................... 381/41-43; 395/2

[56] References Cited

U.S. PATENT DOCUMENTS

| Re. 33,597 | 5/1991 | Levinson et al. | 381/43 |
|---|---|---|---|
| 4,587,670 | 5/1986 | Levinson et al. | 381/43 |
| 4,852,180 | 7/1989 | Levinson | 381/43 |
| 5,040,215 | 8/1991 | Amano et al. | 381/43 |

OTHER PUBLICATIONS

"A Neural Network Model Extracting Features From Speech Signals" by T. Ito et al. Systems and Comm. in Japan, vol. 19, No. 3, Mar. 1988, pp. 32-45.
"Learning Phonetic Features Using Connectionist Networks: An Experiment in Speech Recognition", by R. L. Watrous et al., IEEE First International Conference on Neural Networks, vol. IV, 21 Jun. 1987, pp. 381-388.
"Speech Pattern Discrimination and Multilayer Perceptrons" by H. Bourlard et al, Computer Speech and Language, vol. 3, No. 1, Jan. '89, pp. 1-19.
"Perceptrons and Multi-Layer Perceptrons in Speech Recognition: Improvements From Temporal Warping of the Training Material" by B. Kammerer et al, Neural Networks From Models to Applications, Jun. 6, 1988, pp. 531-540.
"Self-Organization and Associative Memory"; 2nd edition, by T. Kohonen, 5.6, pp. 141-142, 170 and 202-203.

Primary Examiner—Robert L. Richardson
Assistant Examiner—Kee M. Tung
Attorney, Agent, or Firm—Pollock, Vande Sande and Priddy

[57] ABSTRACT

Multiple examples of a vocabulary of known words are recorded. The examples of each word are temporally aligned and supplied to a neural net which identifies unique features of each word which discriminate it from other words in the vocabulary. These unique features are integrated with parameters of a Hidden Semi-Markov model and stored. Speech signals from unknown words are then compared with the stored unique feature information after syntax restriction.

8 Claims, 3 Drawing Sheets

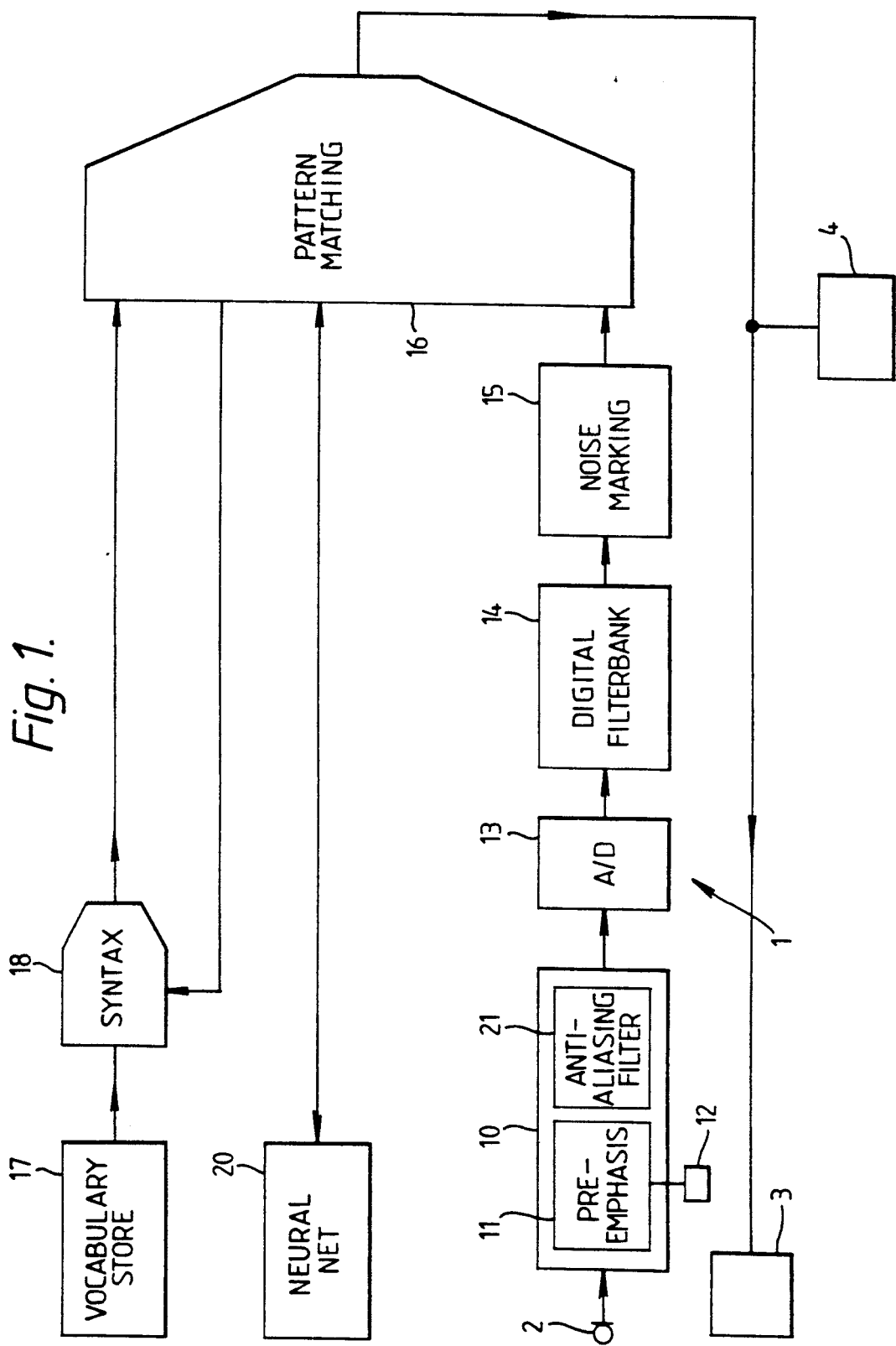

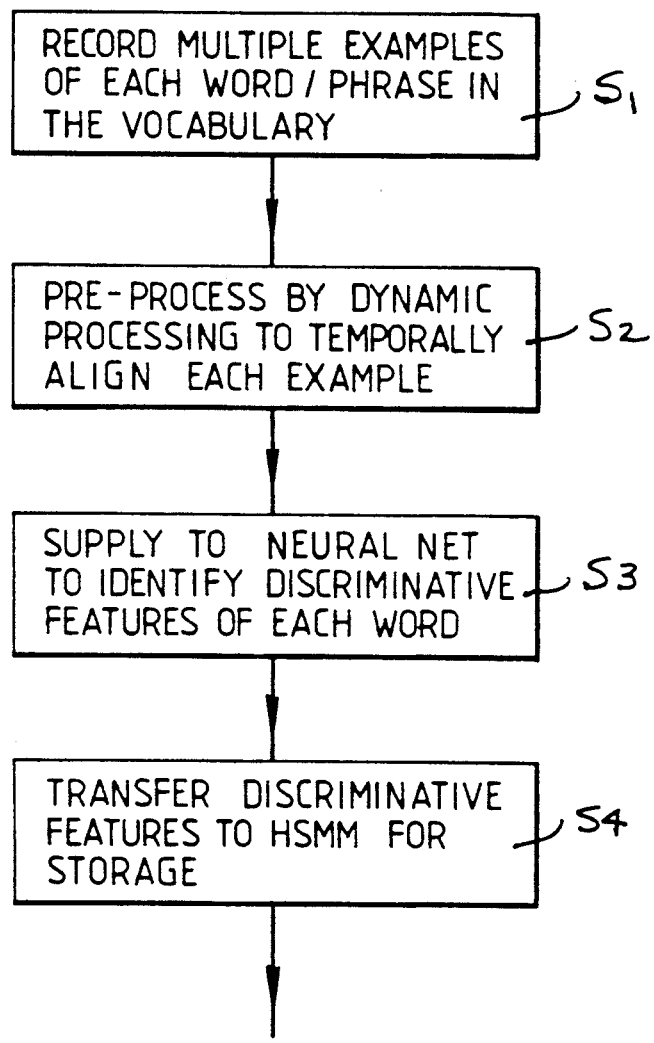

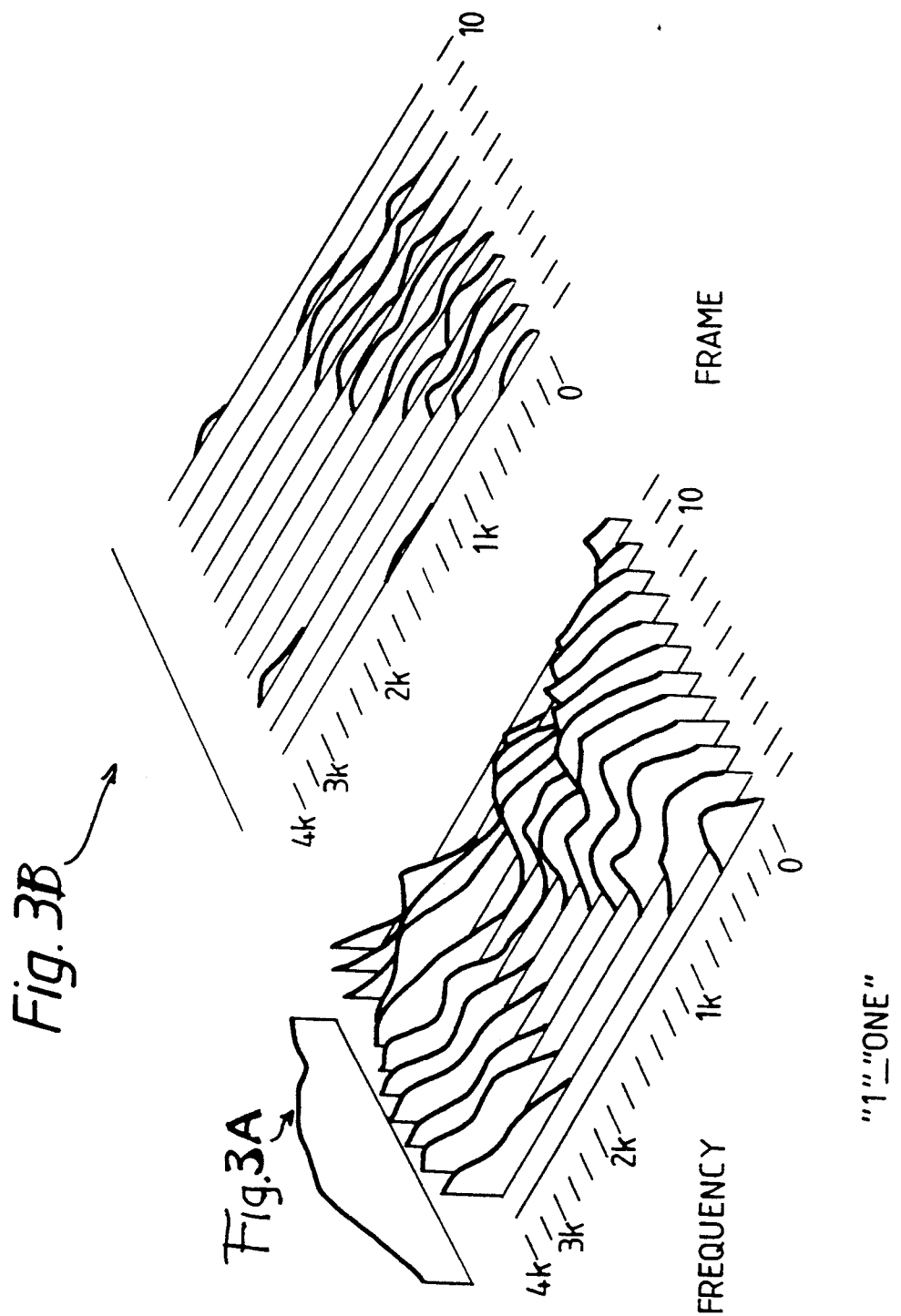

SPEECH RECOGNITION USING A NEURAL NET

This application is a continuation-in-part, division of Bickerton U.S. application Ser. No. 07/517,182 filed on May 1, 1990 now abandoned.

BACKGROUND OF THE INVENTION

This invention relates to speech recognition apparatus and methods.

In complex equipment having multiple functions it can be useful to be able to control the equipment by spoken commands. This is also useful where the user's hands are occupied with other tasks or where the user is disabled and is unable to use his hands to operate conventional mechanical switches and controls.

Programming of speech recognition apparatus is achieved by reading out a list of words or phrases to be entered into a reference vocabulary. The speech sounds are broken down into spectral components and stored as spectral-temporal word models or templates.

When an unknown word is subsequently spoken this is also broken down into its spectral components and these are compared with the reference vocabulary by means of a suitable algorithm such as the Hidden Semi-Markov Model. The reference vocabulary is preferably established by multiple repetitions of the same word in different circumstances and by different people. This introduces a spread or broadening of the word models so that there is a higher probability that when the same word is subsequently spoken it will be identified against that word model. However, it can result in overlap of similar word models leading to a greater probability of an incorrect identification.

The use of neural nets has also been proposed but these are not suitable for identification of continuous speech.

The ability to achieve accurate identification of spoken words is made more difficult in adverse circumstances such as with high background noise or when the speaker is subject to stress.

BRIEF SUMMARY OF THE INVENTION

It is an object of the invention to provide speech recognition methods that can be used to improve the recognition of speech sounds.

According to one aspect of the present invention there is provided a method of speech recognition comprising the steps of supplying speech signals in respect of a plurality of known words or phrases to a neural net, arranging for the neural net to identify the unique features of each word or phrase that discriminate them from all others of said words or phrases, supplying information in respect of these discriminative features together with information identifying the word or phrase with which they are associated to store means to build up a reference vocabulary, and subsequently comparing speech signals in respect of an unknown one of said words or phrases with discriminative features in said vocabulary store so as to identify the unknown words or phrase.

The method preferably includes the steps of speaking each known word or phrase a plurality of times and temporally aligning the examples of each word to produce the speech signals that are supplied to the neural net. The features of each word or phrase that are unique to the word or phrase and discriminate it from others of said words or phrases may, for example, be spectral features or linear predictive coefficients. The comparison of speech signals in respect of an unknown word or phrase with the reference vocabulary of discriminative features is preferably carried out by a Hidden Semi-Markov Model technique. The reference vocabulary in the store means may contain dynamic time warping templates of the discriminative features. Syntax restriction on the reference vocabulary is preferably performed according to the syntax of previously identified words.

According to another aspect of the present invention there is provided apparatus for performing the method of the above one aspect of the invention.

Speech recognition apparatus and its method of operation, in accordance with the present invention, will now be described, by way of example, with reference to the accompanying drawings.

BRIEF DESCRIPTION OF THE DRAWINGS

FIG. 1 shows the apparatus schematically;
FIG. 2 illustrates steps in the method; and
FIGS. 3A and 3B illustrate a step in the method.

DESCRIPTION OF THE PREFERRED EMBODIMENTS

The speech recognition apparatus is indicated generally by the numeral 1 and receives speech input signals from a microphone 2 which may for example be mounted in the oxygen mask of an aircraft pilot. Output signals representative of identified words are supplied by the apparatus 1 to a feedback device 3 and to a utilization device 4. The feedback device 3 may be a visual display or an audible device arranged to inform the speaker of the words as identified by the apparatus 1. The utilization device 4 may be arranged to control a function of the aircraft equipment in response to a spoken command recognized by the utilization device from the output signals of the apparatus.

Signals from the microphone 2 are supplied to a pre-amplifier 10 which includes a pre-emphasis stage 11 that produces a flat long-term average speech spectrum to ensure that all the frequency channel outputs occupy a similar dynamic range, the characteristic being nominally flat up to 1 kHz. A switch 12 can be set to give either a 3 or 6 dB/octave lift at higher frequencies. The pre-amplifier 10 also includes an anti-aliasing filter 21 in the form of an 8th order Butterworth low-pass filter with a −3dB cut-off frequency set at 4 kHz.

The output from the pre-amplifier 10 is fed via an analogue-to-digital converter 13 to a digital filterbank 14. The filterbank 14 has nineteen channels implemented as assembly software in a TMS32010 microprocessor and is based on the JSRU Channel Vocoder described by Holmes, J.N in IEE Proc., Vol 127, Pt.F, No.1, February, 1980. The filterbank 14 has uneven channel spacing corresponding approximately with the critical bands of auditory perception in the range 250-4000Hz. The responses of adjacent channels cross at approximately 3dB below their peak. At the center of a channel the attenuation of a neighbouring channel is approximately 11dB.

Signals from the filterbank 14 are supplied to an integration and noise marking unit 15 which incorporates a noise marking algorithm of the kind described by J.S. Bridle et al. .A noise compensating spectrum distance measure applied to automatic speech recognition. Proc. Inst. Acoust., Windemere November, 1984'. Adaptive noise cancellation techniques to reduce periodic noise may be implemented by the unit 15 which can be useful in reducing, for example, periodic helicopter noise.

The output of the noise marking unit 15 is supplied to a pattern matching unit 16 which performs the various pattern matching algorithms. The pattern matching unit 16 is connected with a vocabulary store 17 which contains Markov models in respect of discriminative features of each word or phrase in the reference vocabulary. The discriminative features are entered to the vocabulary in the manner shown in FIGS. 2 and 3.

As shown in FIG. 2, isolated examples of each of the words or phrases to be entered in the reference vocabulary are recorded. This is repeated so that multiple examples of each word or phrase are available(Step S1). Next, the individual recorded utterances are temporally aligned to the median of the utterances by means of dynamic processing(Step S2). This removes the temporal variations in natural speech, where the same word can be spoken at different speaking rates. The median word is selected as that of average duration, or by using some other distance metric which places the word in the middle of the group of words. For example, if the reference vocabulary comprises the digits "zero" to "nine", all the training repetitions of each number, after the dynamic processing, will have the same time duration.

The time aligned set of training words are now presented to a neural net(Step S3). The neural net structure 20 may be single or multiple layered with any conventional error back propagation learning strategy. The neural net 20 is arranged to learn the discriminative spectral features of the vocabulary, that is, those features of one word which discriminate it from all other words in the vocabulary. An example of this is illustrated in FIG. 3A which shows the spectral-temporal analysis of the spoken digit "one". FIG. 3B shows those features of the digit "one" which discriminate it from the digits "zero", "two", "three" and so on.

The discriminative features are unique to that work or phrase and discriminate the word or phrase from every other word or phrase in the vocabulary. The discriminative features are then transferred to a conventional algorithm which is able to overcome the temporal variability of natural speech(Step S4). In this example the Hidden Semi-Markov Model (HSMM) is used. It is only these discriminative features identified by the neural net that are integrated with the HSMM parameters for storage in the store 17 (FIG. 2) together with information identifying the work or phrase associated with the discriminative features. Any number of words or phrases can be stored according to the storage capacity but, in general, at least three words or phrases will be stored.

In this way, a reference vocabulary is established in the store 17 that contains a model of each word or phrase in the vocabulary, which takes into account the confusibility of that word with other words in the vocabulary. The enrollment procedure for subsequent pattern matching is thereby improved.

The discriminative features used to identify each word need not necessarily be spectral features but could be linear predictive coefficients or any other feature of the speech signal.

The word models in the store 17 may be Dynamic Time Warping (DTW) templates in order to take care of temporal variability and the neural net distance metric summed across the word. A syntax unit 18, connected between the vocabulary store 17 and the pattern matching unit 16, may be used to perform conventional syntax restriction on the stored vocabulary with which the speech is compared, according to the syntax of previously identified words.

The method enables recognition of continuous speech using a neural net enrollment process with the improved recognition performance this can achieve but without excessive processing capacity.

What I claim is:

1. A method of speech recognition comprising the steps of: (a) establishing a reference vocabulary by supplying speech signals in respect of at least three known words or phrases to a neural net, each of said words or phrases comprising a plurality of features some of which features are common to at least two of said words or phrases, and each word or phrase also having at least one feature that is unique to that word or phrase and that is not present in any other of said words or phrases and that thereby discriminates that word or phrase from the other words or phrases, comparing in the neural net the features of each word or phrase to identify said unique features together with information identifying the word or phrase with which they are associated to store means to build up the reference vocabulary; and (b) subsequently comparing speech signals in respect of an unknown one of said words or phrases with said unique features in said reference vocabulary store means so as to identify the word or phrase.

2. A method according to claim 1, including the steps of speaking each known word or phrase a plurality of times, and temporarily aligning examples of each word to produce the speech signals that are supplied to the neural net.

3. A method according to claim 1, wherein the unique features of each word or phrase that discriminate them from all others of said words or phrases are spectral features.

4. A method according to claim 1, wherein the unique features of each word or phrase that discriminate them from all others of said words or phrases are linear predictive coefficients.

5. A method according to claim 1, wherein the comparison of speech signals in respect of an unknown word or phrase with the reference vocabulary of unique features is carried out by a Hidden Semi-Markov Model technique.

6. A method according to claim 1, wherein the reference vocabulary in the store means contains dynamic time warping templates of the unique features.

7. A method according to claim 1, wherein syntax restriction on the reference vocabulary is performed according to the syntax of previously identified words.

8. Speech recognition apparatus comprising: a neural net for comparing features of speech signals in respect of at least three known words or phrases each of which words or phrases comprises a plurality of features which are common to at least two of said words and phrases, each word or phrase also having at least one feature that is unique to that word or phrase, the neural net identifying said unique features; a store; means for supplying information from said neural net in respect of only said unique features to said store to build up a reference vocabulary; a speech sensor for providing speech signals in respect of speech sounds; a comparator; and means for connecting said comparator with said speech sensor and said store such that the speech signals in respect of an unknown word or phrase are compared with the unique features in said reference vocabulary store so as to identify the unknown word or phrase.

* * * * *